Figure 1:
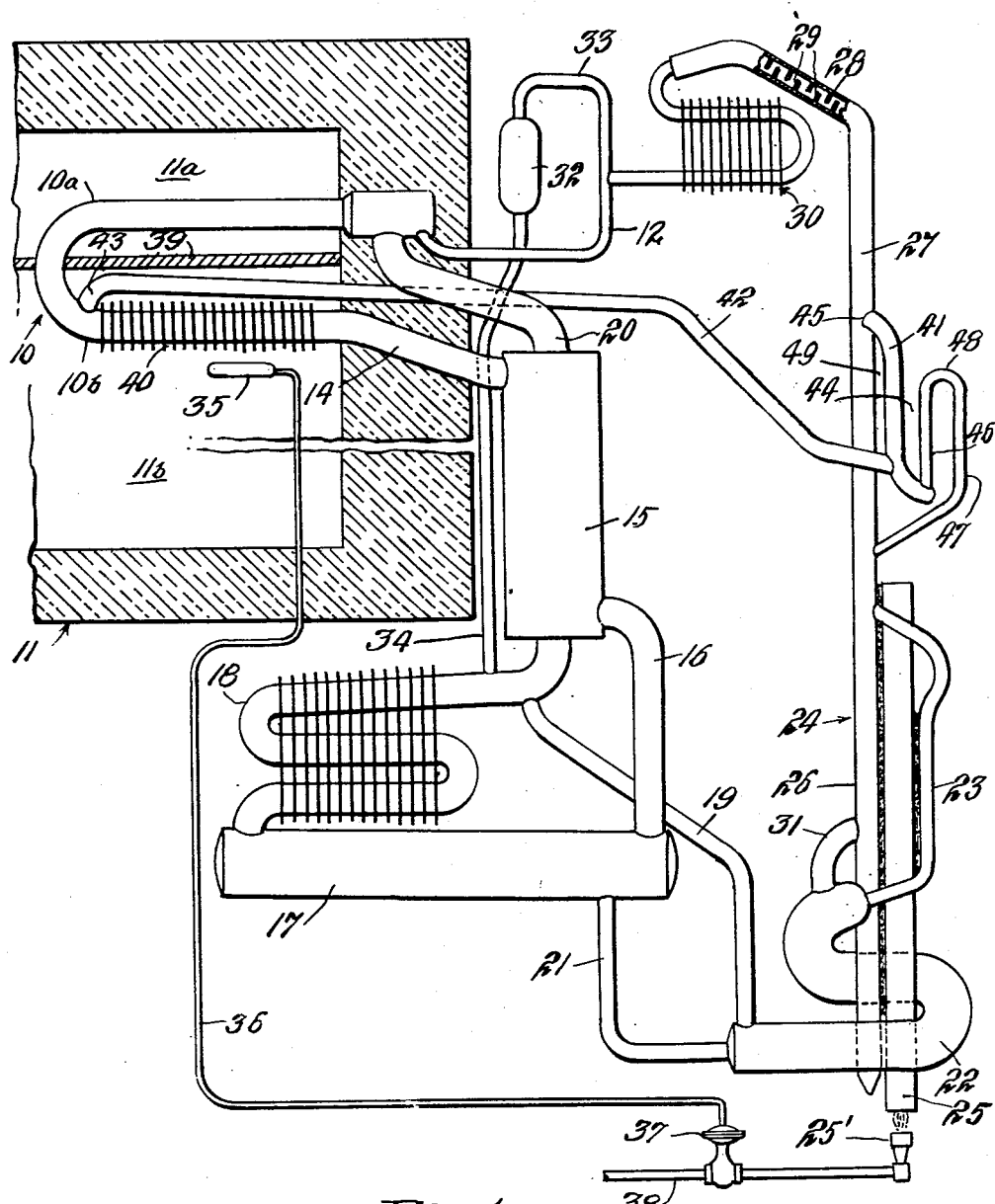

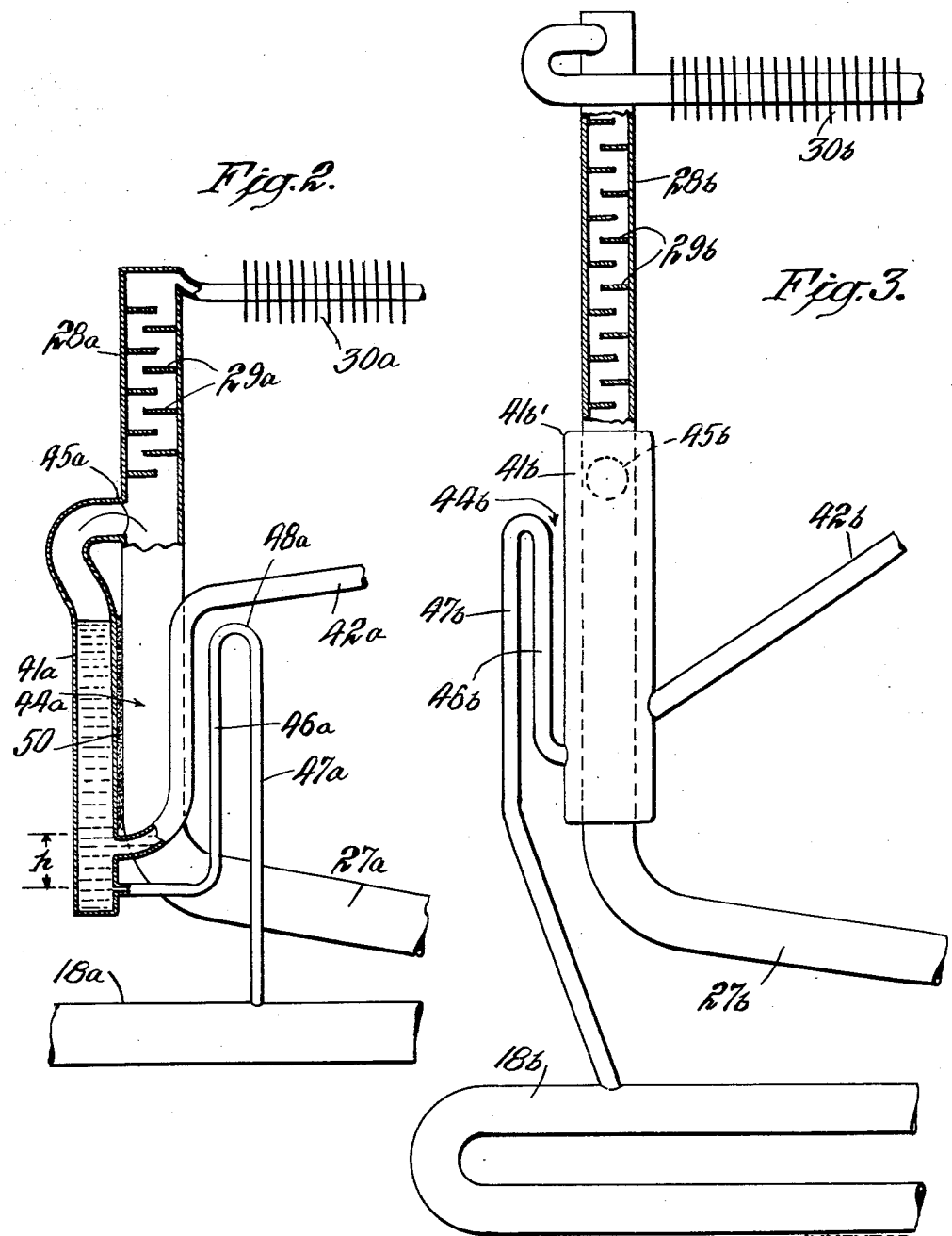

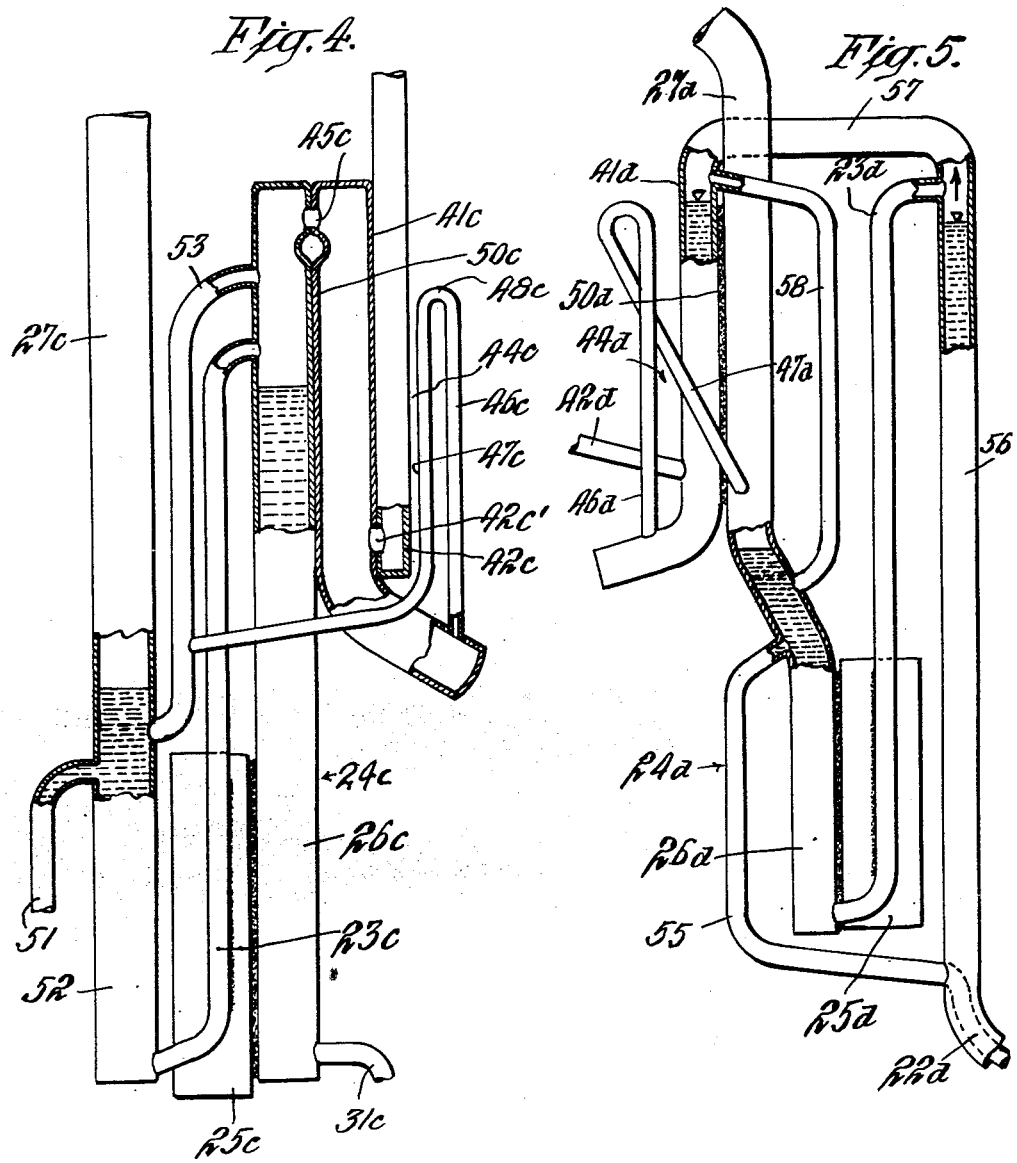

United States Patent Office 2,956,415
Patented Oct. 18, 1960

2,956,415

METHOD OF AND APPARATUS FOR DEFROSTING COOLING UNITS OF REFRIGERATION SYSTEMS

Wilhelm Georg Kogel, Stockholm, Sweden, assignor to Aktiebolaget Elektrolux, Stockholm, Sweden, a corporation of Sweden Filed Oct. 11, 1956, Ser. No. 615,344

Claims priority, application Sweden Oct. 26, 1955

20 Claims. (Cl. 62—81)

My invention relates to refrigeration and more particularly to defrosting of cooling units of refrigeration systems.

It is an object of my invention to provide an improvement for automatically initiating and terminating defrosting of a cooling unit of a refrigeration system in accordance with changes in an operating condition in the system.

Another object is to provide an improvement for automatically terminating defrosting of a cooling unit of a refrigeration system responsive to a change in an operating condition in the system and automatically initiating such defrosting responsive to an even greater change in the same operating condition.

A further object is to provide, in a refrigeration system in which hot vapor flows in thermal exchange relation with a cooling unit to melt frost accumulated thereon, an improvement for automatically initiating flow of hot vapor in a path of flow to effect defrosting after accumulating a first body of liquid in the path of flow and removing the liquid from the path of flow at a region intermediate its ends, and automatically terminating the flow of hot vapor in its path of flow upon accumulating another body of liquid of less size than the first body.

A still further object is to provide an improvement for controlling defrosting of a cooling unit of a refrigeration system responsive to accumulation of liquid resulting from condensation of vaporous fluid in accordance with the so-called "cold wall" principle.

A still further object is to provide an improvement for controlling defrosting of a cooling unit of a refrigeration system responsive to accumulation of liquid at a substantially constant rate under all operating conditions encountered in accordance with the so-called "cold wall" principle.

A still further object is to provide an improvement for controlling defrosting of a cooling unit of a refrigeration system responsive to accumulation of liquid which is formed by condensing vaporous fluid at a substantially constant rate under all operating conditions encountered with the aid of inert gas which provides a protective atmosphere through which the vaporous fluid must sometimes diffuse.

A still further object is to provide an improvement for controlling defrosting of a cooling unit of a refrigeration system of the inert gas type by maintaining the temperature differential between different parts essentially the same under normal operating conditions and also when operation of the system is resumed following a shutdown period, whereby condensation of vaporous fluid can be effected at a substantially constant rate in the lower temperature part in accordance with the so-called "cold wall" principle.

A still further object is to provide an improvement for controlling defrosting of a cooling unit of a refrigeration system responsive to accumulation of liquid in a trap whereby defrosting is effected until a definite quantity of liquid has accumulated in the trap and resumes after an additional definite quantity of liquid has accumulated in the trap and liquid in the trap is removed therefrom to a place in the system other than the cooling unit.

A still further object is to provide an improvement for controlling defrosting of a cooling unit of a refrigeration system responsive to accumulation of liquid in a trap whereby defrosting is effected during the interval of time that it takes for a definite quantity of liquid to accumulate in the trap after liquid has been siphoned therefrom and defrosting is again initiated after sufficient liquid continues to accumulate in the trap for the liquid to be siphoned therefrom again.

A still further object is to provide, in a refrigeration system having low and higher temperature cooling unit sections for cooling frozen and unfrozen food spaces, respectively, an improvement for defrosting the higher temperature cooling unit section with hot vapor in the system while enabling the low temperature cooling unit section to continue functioning to produce a refrigerating effect for cooling the frozen food space.

A still further object is to provide, in an absorption refrigeration system of the inert gas type having a gas circuit including low and higher temperature cooling unit sections for cooling frozen and unfrozen food spaces, respectively, an improvement for evaporating refrigerant in the presence of inert gas in the low temperature cooling unit section to produce a refrigerating effect therein while flowing hot vapor in the system into the gas circuit for flow through the higher temperature cooling unit section to melt frost or ice accumulated thereon.

The above and other objects and advantages of the invention will become apparent as the following description proceeds, and the features of novelty which characterize my invention will be pointed out with particularity in the claims annexed to and forming a part of this specification.

Figure 6:
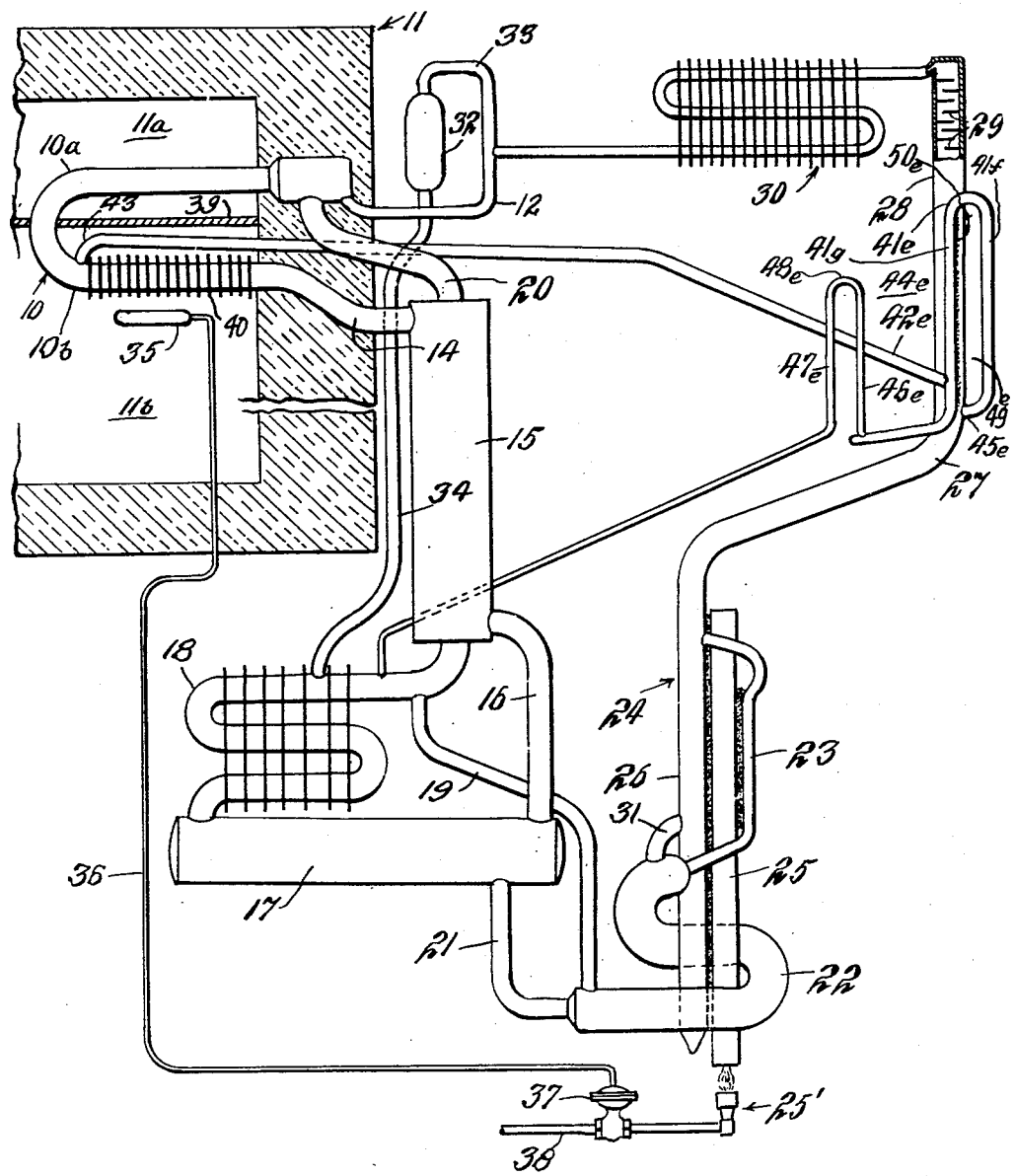

For a better understanding of my invention, reference may be had to the following description taken in connection with the accompanying drawing, in which:

Fig. 1 illustrates more or less diagrammatically an absorption refrigeration system of the inert gas type embodying the invention;

Figs. 2 to 5, inclusive, are fragmentary views of parts like those shown in Fig. 1 diagrammatically illustrating other embodiments of the invention; and Fig. 6 is a view similar to that shown in Fig. 1 illustrating a still further embodiment of the invention.

Referring to Fig. 1, I have shown my invention in connection with a hermetically sealed absorption refrigeration system of a uniform pressure type in which an auxiliary pressure equalizing gas is employed. Air-cooled systems of this type are well known and include a cooling unit or evaporator structure 10 which is arranged to abstract heat from the thermally insulated interior of a refrigerator cabinet 11. Refrigerant fluid, such as ammonia, passes through a conduit 12 into the cooling unit 10 and evaporates and diffuses therein into an inert gas, such as hydrogen, to produce a refrigerating effect. The resulting gas mixture of refrigerant and inert gas flows from cooling unit 10 through a conduit 14, one passage of gas heat exchanger 15 and vertically extending conduit 16 into an air-cooled absorber comprising an absorber vessel 17 and a looped absorber coil 18.

In the absorber refrigerant vapor is absorbed by a suitable absorbent such as water, for example, which is introduced into coil 18 through a conduit 19. The hydrogen or inert gas, which is practically insoluble and weak in refrigerant, is returned to cooling unit 10 through another passage of gas heat exchanger 15 and a conduit 20.

The circulation of gas in the gas circuit just described is due to the difference in specific weight of the columns of gas rich and weak, respectively, in refrigerant vapor. Since the column of gas rich in refrigerant vapor and flowing from cooling unit 10 to the absorber coil 18 is heavier than the gas weak in refrigerant vapor and flowing from such coil to the cooling unit 10, a force is produced or developed within the system for causing circulation of inert gas in the manner described.

Enriched absorption liquid, which is also referred to as absorption solution, is conducted from the vessel 17 through a conduit 21 and liquid heat exchanger 22 into a vapor lift pump 23 of a generator or vapor expulsion unit 24. The generator 24 comprises a heating tube 25 having the vapor lift pump 23 and a boiler pipe 26 in thermal exchange relation therewith. By heating generator 24, as by an electrical heating element or by a fluid fuel burner 25′, for example, liquid from the liquid heat exchanger 22 is raised by vapor lift action through pump 23 into the upper part of boiler pipe 26. The liberated lifting vapor entering boiler pipe 26 through the pump 23, and also vapor expelled from solution in the boiler pipe, flows upwardly through a conduit or vapor line 27 into an air-cooled rectifier 28 in which absorption liquid vapor accompanying the refrigerant vapor is condensed. The rectifier 28, which may be provided with internal baffles 29, effects cooling of the expelled vapor which is sufficient to cause condensation of absorption liquid vapor while refrigerant vapor, which condenses at a lower temperature than the absorption liquid vapor, flows from the rectifier to an air-cooled condenser 30. The condensate formed in rectifier 28 flows by gravity through the conduit or vapor line 27 back to the generator 24.

Refrigerant vapor is liquefied in the condenser 30 by surrounding cooling air which flows over the surfaces of the coil and fins, and liquefied refrigerant is returned to the cooling unit 10 through the conduit 12 to complete the refrigerating cycle. Liquid refrigerant flows by gravity in the cooling unit 10, the refrigerant flowing in parallel flow with the inert gas in a low temperature section 10a and then in a higher temperature section 10b of the cooling unit. The weakened absorption solution, from which refrigerant has been expelled, is conducted from boiler pipe 26 through a conduit 31, liquid heat exchanger 22 and conduit 19 into the upper part of absorber coil 18. Circulation of absorption solution in the manner just described is due to raising of liquid to a high level in boiler pipe 26 from which liquid can flow by gravity to the upper end of absorber coil 18 through conduit 16.

A pressure vessel 32 is connected by conduits 33 and 34 to the lower end of condenser 30 and to the gas circuit, as at the upper part of absorber coil 18, for example, so that any inert gas which may pass into the condenser can flow into the gas circuit. Refrigerant vapor not liquefied in condenser 30 will flow through conduit 33 to displace inert gas in vessel 32 and force such inert gas through conduit 34 into the gas circuit, thereby raising the total pressure in the system so that an adequate condensing is obtained to insure condensation of refrigerant vapor in condenser 30.

The refrigeration system just described may be controlled by a thermal bulb 35 which is affected by a temperature condition of cooling unit section 10b. As shown, the thermal bulb 35, which is arranged to be influenced by the temperature of air which is cooled by the higher temperature section 10b, is connected by a conduit 36 to a control device 37 which is connected in a fuel supply conduit 38 of burner 25′. In a manner well known in the art, the thermal bulb 35 and conduit 36 may form part of an expansible fluid thermostat which is charged with a suitable volatile fluid and responds to changes in a temperature condition affected by cooling unit section 10b to operate control device 37.

When the temperature condition affected by cooling unit section 10b increases due, for instance, to increase in heat load caused by the placing of warm material in the thermally insulated interior of the refrigerator, or a rise in room air temperature, the thermal bulb 35 in normal operation of the refrigeration system becomes effective to operate control device 37 to increase the supply of fuel to burner 25′. This increases the heat input and hence the rate at which vapor is expelled from solution in generator 24, thereby increasing the amount of refrigerant vapor which condenses in condenser 30 and flows into cooling unit 10. Conversely, when the temperature condition affected by cooling unit section 10b decreases, the thermal bulb 35 becomes effective to operate control device 37 to decrease the supply of fuel to burner 25′. This reduces the heat input and hence the rate at which vapor is expelled from solution in generator 24, thereby decreasing the amount of refrigerant vapor which condenses in condenser 30 and flows into cooling unit 10.

The thermostatic control just described is of the kind in which the supply of fuel desirably is reduced to such an extent that substantially no vapor is expelled from solution in generator 24 when the cooling unit section 10b reaches a predetermined low temperature. In other words, under these conditions, only a sufficient quantity of fuel is supplied to the burner 25′ to maintain the latter ignited and only heat of liquid is supplied to the solution in generator 24. When the fuel supply to burner 25′ is inadequate for the burner to supply heat of vaporization to the solution in the generator, no expulsion of vapor from solution will take place and the solution will be maintained below its boiling temperature. Since no expulsion of vapor from solution will take place in generator 24 when the supply of fuel to burner 25′ is reduced sufficiently by the thermostatic control in the manner just explained, no lifting of liquid by vapor lift action will take place in the vapor lift pump 23 and the circulation of absorption solution through and between the generator 24 and absorber coil 18 will stop. Hence, when the thermostatic control provided acts to reduce the supply of fuel to burner 25′ and vapor is no longer expelled from solution in the generator 24 and pump 23 is no longer effective to raise liquid to cause circulation of absorption solution, the supply of heat to the generator 24 for the purpose of producing useful refrigeration is interrupted and essentially cut off for all practical purposes.

Since the inert gas flows successively through the cooling unit sections 10a and 10b, the gas in the upper cooling unit section 10a contains a lesser amount of refrigerant vapor than the gas in the lower cooling unit section 10b. The partial vapor pressure of the refrigerant is a gradient, so that the temperature of liquid refrigerant in the cooling unit is also a gradient, the evaporating temperature of liquid being lower in cooling unit section 10a than in cooling unit section 10b.

The refrigerating effect produced by the upper cooling unit section 10a, which is adapted to be operated at temperatures substantially below freezing, is primarily utilized to effect cooling of an upper frozen food space 11a which is defined by a partition 39 and the thermally insulated walls of the cabinet 11. Accordingly, the upper compartment 11a serves as a freezing space which is adapted to receive ice trays, frozen food packages and other matter to be frozen.

The refrigerating effect produced by the lower cooling unit section 10b, which is adapted to be operated at a higher temperature than that of cooling unit section 10a and also desirably below freezing, is primarily utilized to cool air in an unfrozen food space 11b. To increase the effective heat transfer surface of the lower cooling unit section 10b so as to promote cooling of air in the unfrozen food space 11b, a plurality of fins or heat transfer members 40 may be secured thereto in any suitable manner.

Although the refrigerator cabinet 11 is only diagrammatically illustrated, it will be understood that the frozen food space 11b is provided with a separate closure member (not shown) from that provided for the unfrozen food space 11b. While frost accumulates on both the cooling unit sections 10a and 10b, such accumulation of frost takes place much more slowly in the upper space 11a than in the lower space 11b because the need for gaining access into the former is considerably less than that for the latter. Each time the closure member (not shown) for the unfrozen food space 11b is opened to gain access thereto, some of the cool air therein is displaced by ambient air in which water vapor is present. Such air flows over the surfaces of the cooling unit section 10b due to natural circulation of air which is induced in the space 11b, the water vapor in the air condensing on the piping and fins of the cooling unit section 10b to form a layer of frost or ice thereon. If a layer of frost of considerable thickness were allowed to accumulate on the lower cooling unit section 10b, the efficiency of the refrigeration system would be reduced considerably and the system would operate for longer periods of time to maintain the unfrozen food space 11b at a desired low temperature than would otherwise be the case.

In order to effect defrosting of cooling unit section 10b, vapor expelled from generator 24 and at an elevated temperature is conducted therefrom to cooling unit 10 in a path of flow which includes the conduit or vapor line 27 and conduits 41 and 42. By introducing hot expelled vapor into the cooling unit 10, the partial pressure of the refrigerant vapor in the cooling unit increases and the temperature thereof rises above the freezing temperature of water. In this manner, the frost accumulated on the cooling unit 10 is melted very rapidly by the hot vapor supplied thereto from generator 24 in a path of flow which by-passes the condenser 30.

In accordance with my invention, the hot vapor from generator 24 is supplied through the vapor line 27 and conduits 41 and 42 to a region of cooling unit 10 which will effectively defrost the lower cooling unit section 10b and enable the upper cooling unit section 10a to continue functioning to produce a refrigerating effect in the frozen food space 11a. Referring to Fig. 1, it will be seen that conduit 42 is connected at its upper end to a region 43 of the cooling unit 10 at which inert gas partially enriched in refrigerant vapor and flowing from the upper cooling unit section 10a is about to enter the lower cooling unit section 10b. When hot vapor from generator 24 is being diverted from the vapor line 27 into conduits 41 and 42 for flow through the lower cooling unit section 10b, some vapor still flows upwardly through the vapor line into condenser 30 in which it is liquefied and from which refrigerant condensate flows through conduit 16 to the upper cooling unit section 10a. When hot vapor is introduced into the cooling unit at the region 43, such hot vapor mixes with the inert gas which has been discharged from the upper cooling unit section 10a and flows in parallel flow therewith into the lower cooling unit section 10b.

While hot vapor is being supplied to the lower cooling unit section 10b to increase its temperature and melt frost accumulated thereon, liquid refrigerant supplied to the upper evaporator section 10a evaporates therein in the presence of inert gas to produce a refrigerating effect which makes it possible to continue to store food and other matter at a safe refrigerating temperature in the frozen food space 11a and to produce ice cubes therein. Further, defrosting of the lower cooling unit section 10b by hot gases from generator 24 can be effected sufficiently rapidly so that the temperature of the unfrozen food space 11b, which forms a part of the thermally insulated interior of the cabinet, only increases a relatively small amount, so that foods can be stored therein at a safe refrigerating temperature during the time defrosting of the lower cooling unit section 10b is being effected.

In accordance with my invention, I provide a U-shaped trap 44 at the region expelled vapor is diverted directly to the cooling unit 10 from the vapor line 27 and automatically collect liquid in a controlled manner in the trap and automatically remove the collected liquid therefrom to provide a completely automatic defrosting control which forms a part or component of the hermetically sealed refrigeration system and is operable responsive to an operating condition of the system. As shown in Fig. 1, the U-shaped trap 44 includes the conduit 41, which is connected at 45 to an opening in the vapor line 27 and extends downwardly therefrom, and one arm 46 of an inverted U-shaped conduit having its other arm 47 connected at its lower end to the conduit or vapor supply line 27.

The conduit 41, which is closed at its lower end, includes an intermediate part, which is closely adjacent to the vapor line 27 and is disposed alongside of the latter, and a bottom part which, by reason of extending from the vapor line at an acute angle thereto, will be less affected by the heating effect of the vapor line 27. It will be seen that the arm 46 is connected to the conduit 41 at a region immediately above the bottom closed end thereof, while the conduit 42 leading to the cooling unit section 10b is connected to conduit 41 at a level between the connection of arm 46 thereto and the closed end 48 of the arms 46 and 47.

Since the conduit 41, other than at the region 45 at which it is connected to the vapor supply line 27, is spaced from the latter by a gap 49, the wall of conduit 41 is always at a somewhat lower temperature than that of the vapor supply line during operation of the refrigeration system and expelled vapor passing from vapor line 27 into the conduit 41 condenses therein, such condensation taking place in accordance with what may be referred to as the "cold wall" principle. The condensate formed at the inner wall surface of conduit 41 collects in the latter and eventually seals and closes the lower end of conduit 42, so that hot vapor will no longer flow from the vapor line 27 to the lower cooling unit section 10b through conduits 41 and 42.

After flow of hot vapor into conduit 42 is blocked by the liquid column in the conduit 41, liquid condensate continues to collect in the U-shaped trap 44 and the conduit 42 until it reaches the overflow point 48 in arm 46, at which time the liquid collected in the trap will automatically flow therefrom by siphon action into arm 47 and return to vapor line 27. Accordingly, all of the liquid in conduit 42 and U-shaped trap 44, except the small amount in conduit 41 below the connection of arm 46 thereto, is automatically removed therefrom in a single operation by siphon action, the removed liquid flowing into the vapor line and flowing by gravity to the generator 24.

With removal of liquid from conduit 42 and U-shaped trap 44, hot expelled vapor can flow from the vapor line 27 to the lower cooling unit section 10b through conduits 41 and 42 so as to melt frost accumulated on the lower cooling unit section. When hot vapor from generator 24 flows through the conduit 42, condensation also takes place at the inner wall surface thereof in accordance with the "cold wall" principle referred to above. The conduit 42, which is connected at its upper end to a top wall portion of cooling unit section 10b so as not to interfere with liquid refrigerant flowing therethrough, slopes downwardly toward the region it is connected to conduit 41, so that condensate formed in the conduit 42 will drain by gravity into the conduit 41 and collect therein. After an interval of time within which the lower cooling unit section has been completely defrosted, the condensate collected in the trap 44 eventually blocks off the flow of hot vapor through conduit 42. Liquid will continue to collect in the trap 44 and also in the conduit 42 due to condensation of expelled vapor at the inner wall surface of the conduit 41 and, after an interval of time, the liquid collected in the trap will again be removed automatically therefrom by siphon action.

The conduit 41, which extends downwardly from the region 45 at which it is connected to the vapor line 27, essentially forms a pocket for collecting liquid condensate. White absorption liquid vapor condenses in the rectifier 28, such condensate returns by gravity to the generator 24 through the vapor line 27. Hence, the condensate collected in the conduit 41 is substantially only that liquid which forms by condensation at the inner wall surface thereof. When the conduit 42 is blocked by liquid collected in the conduit 41, the space in the latter forms a dead-end pocket which is in communication with the vapor line 27 at only a single point 45. Under these conditions, the expelled vapor in the conduit 41 is more or less stagnant and out of the main path of flow of expelled vapor which is conducted through the vapor line 27 from generator 24 to the rectifier 28.

The length of time during which defrosting takes place and the interval of time between defrosting periods can be determined to a great extent by the size of the conduits 41 and 42 and that of the U-shaped liquid trap 44 of which arm 46 forms a part, and by the relative vertical positions of the bottom of conduit 41, the region at which conduit 42 is connected to conduit 41 and the overflow point 48 of the siphon. By way of example and without limitation, the different parts may be dimensioned so that the interval of time between defrosting periods will vary anywhere from twenty hours to two days, which will represent the time it will take for liquid to collect in the conduit 42 and the U-shaped trap 44 to the overflow point 48 after the liquid in the conduit 41 blocks off flow of expelled vapor into conduit 42. Also, the parts may be dimensioned so that the period during which defrosting takes place will vary from thirty minutes to one hour, for example, which will represent the time it will take after liquid has been removed from conduit 42 and trap 44 by siphon action for liquid to collect in the conduit 41 to a level therein at which flow of expelled vapor into conduit 42 is stopped.

In Fig. 1 it will be understood that expulsion of vapor in the generator 24 will stop when the thermostatic control functions to reduce the supply of fuel to burner 25' and only heat of liquid is supplied to absorption liquid in the generator. When this occurs, the vapor line 27 and conduit 41 will no longer be influenced by hot expelled vapor and the temperature of these parts will be reduced. When operation of the system is resumed following a shut-down period, expelled vapor will enter the conduit 41 when it is still relatively cool and the vapor line 27 has been heated by the hot expelled vapor flowing therethrough.

Accordingly, the temperature difference between the conduit 41 and vapor line 27 adjacent thereto will be greater when operation of the system is first started following a shut-down period than when these parts have attained their normal operating temperatures, and expelled vapor will tend to condense and collect within the conduit 41 at a faster rate than normal. When the conduit 41 and vapor line 27 adjacent thereto reach their normal operating temperatures, expelled vapor condenses in conduit 41 and collects in the liquid trap 44 at the normal rate.

The conduit connected to the vapor line 27 may be arranged so that the difference in temperature of its wall surface and that of the vapor line will be less than that obtained in the embodiment shown in Fig. 1 and just described, which will reduce the rate at which expelled vapor is condensed at the inner wall surface of the conduit connected to the vapor line and thereby lengthen the time between defrosting periods. Such a modification is shown in Fig. 2 where parts similar to those illustrated in Fig. 1 are designated by similar reference numerals to which the letter "a" has been added.

In Fig. 2 vapor expelled in the generator flows through a vapor line 27a to a rectifier 28a internally baffled at 29a. From the rectifier 28a refrigerant vapor flows to condenser 30a in which it is condensed and from which condensed refrigerant flows to the cooling unit in the same manner as shown in Fig. 1 and described above. A conduit 41a, which is connected to the vapor line 27a at 45a and extends downwardly therefrom, is thermally connected at 50 to the outer wall surface of the vapor line. The conduit 41a and a conduit 42a, the upper end of which is connected to the cooling unit in a manner like the conduit 42 shown in Fig. 1, provided a path of flow for expelled vapor to melt frost accumulated on the cooling unit. A trap 44a is formed by the conduit 41a and one arm 46a of an inverted U-shaped conduit having the other arm 47a thereof connected at its lower end to a part of the inert gas circuit, as to the gas heat exchanger or to the top part of the absorber coil 18a, for example.

It will be seen that the thermal connection 50 in Fig. 2 extends downwardly from the upper part of conduit 41a to the region conduit 42a is connected thereto. Hence, the extreme bottom part of conduit 41a is out of direct thermal contact with the vapor line 27a. In this way, the likelihood of any vapor bubbles forming in the bottom part of conduit 41a due to heating by the vapor line is avoided, which, if formed might disturb the siphoning of liquid from conduits 41a to 42a when liquid reaches the overflow point 48a.

The temperature of the wall surface of the conduit 41a will be slightly lower than that of the vapor line 27a and expelled vapor in conduit 41a will condense at the inner wall surface thereof. However, the temperature difference between the walls of conduit 41a and vapor line 27a will not be as great as that between the walls of conduit 41 and vapor line 27 in Fig. 1, so that expelled vapor will condense at a slower rate in the conduit 41a of Fig. 2 than in the conduit 41 in the embodiment of Fig. 1. In this manner, the time between defrosting periods may be lengthened or shortened at will depending upon the extent of the heat conductive connection between the vapor line and the conduit connected thereto in which condensate is formed and collected and which forms a part of the expelled vapor connection which by-passes the condenser and communicates with the cooling unit.

Even when the time between defrosting periods is lengthened by employing the arrangement of Fig. 2 rather than that of Fig. 1, by decreasing the height $h$ between the regions at which arm 46a and conduit 42a are connected to the conduit 41a to compensate for the slower rate at which condensate is formed and collected in the latter, the length of the defrosting period may be adjusted so that the defrosting periods in both embodiments will be substantially the same. In general, the operation of the embodiment of Fig. 2 is similar to that described above in connection with Fig. 1 and therefore will not be needlessly repeated here. It is desired to point out, however, that when liquid is removed from the trap 44a in Fig. 2 by siphon action, such liquid flows through arm 47a into the top part of absorber coil 18a and flows through the latter into the absorber vessel to which the coil is connected, in a manner like that shown in Fig. 1.

A further modification is shown in Fig. 3 in which parts similar to those illustrated in the embodiments described above are designated by the same reference numerals to which the letter "b" has been added. In Fig. 3 vapor expelled in the generator flows through a vapor line 27b to a rectifier 28b internally baffled at 29b. From the rectifier 28b refrigerant vapor flows to condenser 30b in which it is condensed and from which condensed refrigerant flows to the cooling unit in a manner like that shown in Fig. 1.

About the vapor line 27b is provided a jacket 41b' forming a vertically disposed passage 41b of annular form which extends downwardly from an opening 45b in the vapor line. A conduit 42b is connected to the jacket 41b' to complete the path of flow for expelled vapor from the vapor line to the cooling unit in a manner like that shown in Fig. 1. A liquid trap 44b is formed by the passage 41b and one arm 46b of an inverted U-shaped conduit, the other arm 47b of which is connected at its lower end to the top part of the absorber coil 18b, for example. It will be evident that the modification of Fig. 3 is more or less like the embodiment of Fig. 2, the primary difference being that in Fig. 3 the jacket 41b' is disposed about the vapor line 27b to form the passage 41b while in Fig. 2 the conduit 41a is thermally connected to the vapor line 27a at 50.

Still further embodiments of the invention are shown in Figs. 4 and 5, in which the vapor line by-passing the condenser and conducting expelled vapor directly to the cooling unit includes a liquid trap associated with parts of the generator. In Fig. 4 parts similar to those illustrated in the embodiments described above are designated by the same reference numerals to which the letter "c" has been appended. In Fig. 4 the generator 24c comprises a heating tube 25c which may be heated by an electrical heating element (not shown) and is thermally connected to a vapor lift pump 23c and boiler pipe 26c, respectively.

Absorption liquid enriched in refrigerant flows from an absorber vessel like the vessel 17 in Fig. 1, for example, and, after flowing through a liquid heat exchanger, is conducted through a conduit 51 to a standpipe 52 to the lower end of which is connected the vapor lift pump 23c. Liquid is raised by vapor-liquid lift action through the pump 23c to the upper part of boiler pipe 26c. The weakened absorption solution, from which refrigerant has been expelled in the boiler pipe 26c, is conducted therefrom through a conduit 31c and another passage of the liquid heat exchanger to the upper part of an absorber coil in the manner shown in Fig. 1, for example.

The liberated lifting vapor entering boiler pipe 26c through the pump 23c, and also vapor expelled from solution in the boiler pipe 26c, flows through a conduit 53 which is connected to standpipe 52 below the liquid level therein. Hence, the upper part of the liquid column in the standpipe 52 forms an analyzer through which expelled vapor passes before entering a vapor line 27c leading to the condenser like the condenser 30 shown in Fig. 1.

In Fig. 4 a conduit 41c, which is heat conductively connected at 50c to the boiler pipe 26c and in communication therewith through an opening 45c, forms one leg of a U-shaped liquid trap 44c, the other leg of which is formed by one arm 46c of an inverted U-shaped conduit having its other arm 47c connected to the conduit 53. The bottom part of the conduit 41c is at an angle to the part heat conductively connected to boiler pipe 26c and projects from the latter so that the likelihood of vapor bubbles forming in the extreme bottom part of conduit 41c is avoided and the siphoning action of the liquid trap 44c will not be disturbed. Due to the so-called "cold wall" principle, expelled vapor passing through opening 45c into conduit 41c condenses therein and collects in the liquid trap 44c. When the liquid in arm 46c reaches the overflow point 48c, liquid is siphoned from the trap 44c through arm 47c into the conduit 53, thereby enabling expelled vapor to flow from conduit 41c through an opening 42c' into a conduit 42c which is connected at its upper end to a cooling unit in a manner similar to the conduit 42 in Fig. 1.

The modification of Fig. 5 differs from that of Fig. 4 in that only vapor employed to raise liquid in the pump pipe passes into one leg of a U-shaped liquid trap to be condensed and collected therein. In Fig. 5, in which parts similar to those illustrated in the embodiments described above are designated by the same reference numerals to which the letter "d" has been appended, the generator 24d comprises a heating tube 25d which is adapted to be electrically heated and is thermally connected to a boiler pipe 26d and pump pipe 23d, respectively.

Absorption liquid enriched in refrigerant flows from the absorber through a passage of liquid heat exchanger 22d and conduit 55 to the boiler pipe 26d. Liquid from which vapor has been expelled in the boiler pipe 26d flows from the bottom part thereof through the pump pipe 23d in which liquid is raised to the upper end of a standpipe 56. Liquid deprived of refrigerant flows from the lower end of standpipe 56 through another passage of liquid heat exchanger 22d to the upper part of an absorber coil like the coil 18 in Fig. 1, for example. Vapor expelled from boiler pipe 26d flows through a vapor line 27d leading to a condenser like the condenser 30 in Fig. 1, for example.

The lifting vapor liberated from the upper end of pump pipe 23d flows through a connection 57 to the upper end of a downwardly extending conduit section 41d which is thermally connected at 50d to the vapor line 27d. The conduit section 41d forms one leg of a U-shaped liquid trap 44d, the other leg of which is formed by an arm 46d of an inverted V-shaped conduit having its other arm 47d connected to the vapor line 27d. When liquid is siphoned from the trap 44d, expelled vapor can flow from conduit section 41d into conduit 42d which is connected at its upper end to a cooling unit in the same manner conduit 42 is connected to cooling unit 10 in Fig. 1.

When the lower end of conduit 42d is sealed by liquid collected in conduit section 41d, the lifting vapor liberated from the upper end of pump pipe 23d then flows through conduit 58 which is connected at its upper end to the vapor space of conduit section 41d and at its lower end to boiler pipe 26d. Hence, vapor flowing through conduit 58 bubbles through liquid in the upper part of boiler pipe 26d and is analyzed, such vapor then mixing with vapor expelled from solution in the boiler pipe 26d and flowing upwardly therewith in the vapor line 27d.

In Fig. 4 it will be seen that the conduit 41c is heat conductively connected at 50c to the boiler pipe 26c in which a column of heated absorption liquid is held. As in Fig. 1 and the other embodiments described, the expulsion of vapor in the generator 24c will stop when the thermostatic control functions to reduce the supply of heat to boiler pipe 26c. When this occurs, the upper part of boiler pipe 26c and conduit 41c will no longer be influenced by hot expelled vapor and the temperature of these parts will be reduced to some extent. However, when operation of the system is resumed following a shut-down period, expelled vapor may enter conduit 41c when it is still relatively warm due to heat transfer thereto from the liquid body held in the boiler pipe 26c.

Accordingly, when operation of the system is first started following a shut-down period, the temperature difference between the boiler pipe 26c and conduit 41c often may approach that attained when these parts reach their normal operating temperatures, and expelled vapor will tend to condense and collect within the conduit 41c at a substantially constant rate when boiler pipe 26c and conduit 41c have attained their normal operating temperatures and also when operation of the system is first started following a shut-down period.

In any event, the conduit 41c continues to receive heat from the heated body of liquid in the boiler pipe 26c when the thermostatic control functions to reduce the supply of heat to the boiler pipe and stop expulsion of vapor, so that when the supply of heat to the boiler pipe is resumed following a shut-down period, the temperature difference between conduit 41c and boiler pipe 26c will be less than it would be if the upper part of the boiler pipe did not contain liquid, the rate at which expelled vapor condenses in conduit 41c not being unduly great even before the parts reach their normal operating temperatures.

In Fig. 6 I have illustrated another embodiment of the invention in which condensate will form and collect in a liquid trap at substantially the same rate under all operating conditions encountered. In Fig. 6 parts of the by-pass around condenser 30 from vapor line 27 to cooling unit 10 which are similar to those illustrated in Fig. 1 are designated by the same reference numerals to which the letter "e" has been added.

In Fig. 6, a U-shaped trap 44e includes one section 41g of the inverted U-shaped conduit 41e which is connected at 45e to an opening in the vapor line 27 and one arm 46e of a second inverted U-shaped conduit having its other arm 47e connected at its lower end to the gas circuit, as to the top part of the absorber coil 18, for example.

The inverted U-shaped conduit 41e includes a section 41f extending upwardly from its connection at 45e to the vapor line and the downwardly extending section 41g thermally connected at 50e to the vapor line. A conduit 42e is connected to conduit section 41g to complete a path of flow for expelled vapor from vapor line 27 to the cooling unit 10. The lower part of conduit section 41g is bent and projects from the vapor line 27, so that it will be out of direct thermal contact with the vapor line and the likelihood of vapor bubbles being formed therein is avoided. It will be seen that the arm 46e is connected to the conduit section 41g at a region immediately above the bottom closed end thereof, while the conduit 42e leading to the cooling unit section 10b is connected to conduit section 41g at a level between the connection of arm 46e thereto and the closed end 48e of the arms 46e and 47e.

When the system shown in the drawing is being operated and vapor is being expelled from the generator and such expelled vapor flows upwardly through the vapor line 27 to the rectifier 28, expelled vapor will also pass into the inverted U-shaped conduit 41e. Since the conduit section 41f, other than at the region 45e at which it is connected to the vapor supply line 27, is spaced from the latter by a gap 49e, and the conduit section 41g is thermally connected along a vertically extending zone 50e to the vapor supply line 27, the walls of both the conduit sections 41f and 41g are at a somewhat slightly lower temperature than that of the vapor supply line during operation of the system and expelled vapor passing from the vapor supply line into both sections 41f and 41g of the inverted U-shaped conduit 41e condenses therein. In view of the slight temperature differential maintained between the vapor supply line 27 and both sections 41f and 41g of conduit 41, condensation is effected in both sections of conduit 41 in accordance with the "cold wall" principle referred to above.

The condensate formed in the conduit section 41f will, of course, drain by gravity into the vapor line 27. The condensate formed at the inner wall surface of conduit section 41g collects in the latter and eventually seals and closes the lower end of conduit 42e, so that hot vapor will no longer flow from the vapor line 27 to the lower cooling unit section 10b through conduits 41e and 42e.

After flow of hot vapor into conduit 42e is blocked by the liquid column in the conduit section 41g, liquid condensate continues to collect in the U-shaped trap 44e and the conduit 42e until it reaches the overflow point 48e in arm 46e, at which time the liquid collected in the trap will automatically flow therefrom by siphon action into arm 47e and flow to the upper part of the absorber coil 18. Accordingly, all of the liquid in conduit 42e and U-shaped trap 44e, except the small amount in conduit section 41g below the connection of arm 46e thereto, is automatically removed therefrom in a single operation by siphon action, the removed liquid flowing into the upper part of absorber coil 18 and flowing by gravity to the generator 24.

With removal of liquid from conduit 42e and U-shaped trap 44e, hot expelled vapor can flow from the vapor line 27 to the lower cooling unit section 10b through the conduits 41e and 42e so as to melt frost accumulated on the lower cooling unit section. When hot vapor from generator 24 flows through the conduit 42e, condensation also takes place at the inner wall surface thereof in accordance with the "cold wall" principle, as explained above in connection with the embodiment of Fig. 1. After an interval of time within which the lower cooling unit section has been completely defrosted, the condensate collected in the trap 44e eventually blocks off the flow of hot vapor through conduit 42e. Liquid will continue to collect in the trap 44e and also in the conduit 42e due to condensation of expelled vapor at the inner wall surface of the conduit section 41g and, after an interval of time, the liquid collected in the trap will again be removed automatically therefrom by siphon action. When the siphon functions to remove liquid from the trap 44e, liquid is withdrawn from a region of the by-pass connection formed by the conduits 41e and 42e at a region intermediate the ends thereof.

The conduit section 41g, which extends downwardly from the upper closed end of conduit 41e which is connected at 45e to the vapor line 27, essentially forms a pocket for collecting liquid condensate. While absorption liquid vapor condenses in the rectifier 28, such condensate returns by gravity to the generator 24 through the vapor line 27. Hence, the condensate collected in conduit section 41g is substantially only that liquid which forms by condensation at the inner wall surface thereof. When the conduit 42e is blocked by liquid collected in the conduit section 41g, the space in the latter forms a dead-end pocket which is in communication with the vapor line at only a single point 45e. Under these conditions, the expelled vapor in the conduit section 41g is more or less stagnant and out of the main path of flow of expelled vapor which is conducted through the vapor line 27 from generator 24 to the rectifier 28.

If the upper end of conduit section 41g were directly connected to the vapor line 27 and the conduit section 41f were omitted, the temperature difference between the conduit section 41g and vapor line 27 adjacent thereto would be greater when operation of the system is first started following a shut-down period than when these parts have attained their normal operating temperatures, and expelled vapor would tend to condense and collect within the conduit section 41g at a faster rate than normal. This is so because, when operation of the system is first started following a shut-down period, expelled vapor would enter the conduit section 41g when it is relatively cool, while the vapor line 27 would be heated by the hot expelled vapor flowing therethrough.

In accordance with my invention, the conduit section 41g forms a part of the inverted U-shaped conduit 41e and is removed from the region the latter is connected at 45e to the vapor line 27, so that condensate will form and collect in conduit section 41g at substantially the same rate under all operating conditions encountered. When the thermostatic control functions to reduce the supply of fuel to burner 25' and only heat of liquid is supplied to the generator 24, the vapor line 27 and conduit sections 41f and 41g will no longer be influenced by hot expelled vapor and the temperature of these parts will be reduced. Under these conditions, inert gas will be drawn into the condenser 30 from the conduit 33. In the event the thermostatic control functions to shut down the operation of the refrigeration system for a sufficiently long period of time, the inert gas drawn into the condenser 30 in the manner just explained will also pass into the vapor line 27 and into the conduit sections 41f and 41g and more or less completely fill these parts.

When the thermostatic control again functions to supply heat at a maximum rate to the generator and expulsion of vapor again takes place, the expelled vapor flows upwardly in the vapor line 27 and initially diffuses through inert gas therein. Likewise, the expelled vapor passing into the conduit section 41f must diffuse through inert gas in this part of conduit 41e before reaching the conduit section 41g. Eventually the inert gas in the conduit sections 41f and 41g, the vapor line 27 and condenser 30 is displaced by the expelled vapor, the inert gas passing from the condenser 30 into conduit 33.

The fact that inert gas can pass into both the vapor line 27 and conduit sections 41f and 41g when the thermostatic control functions to shut down the refrigeration system possesses the advantage that when the system is started again, the expelled vapor effects heating of both the conduit section 41g and the part of the vapor line 27 adjacent thereto for an interval of time before expelled vapor can diffuse through the inert gas in conduit section 41f and reach the conduit section 41g, so that the latter and the part of the vapor line thermally connected thereto are essentially at their normal operating temperatures when expelled vapor commences to condense and collect in the conduit section 41g. Accordingly, the temperature difference between conduit section 41g and the part of the vapor line connected thereto will always be substantially the same when expelled vapor is condensing and being collected in conduit section 41g, whether during normal operation at maximum heat input or when operation of the system is initially resumed following a shut-down period and the temperatures of these parts are increasing to their normal operating range.

In view of the foregoing, it will now be understood that an arrangement has been provided for defrosting a cooling unit of a refrigeration apparatus which is completely automatic in operation, the arrangement being such that it is self-starting and also will automatically terminate of its own accord after an interval of time.

In the different embodiments illustrated and described above, it will be evident that the defrosting arrangement is extremely flexible in character and may be varied to meet different operating conditions encountered. This flexibility is attained by making use of the so-called "cold wall" principle to collect condensate in a pair of upstanding legs of a trap associated with a passage which enables hot expelled vapor to by-pass the condenser and flow to the cooling unit to melt frost and ice accumulated thereon. When liquid has accumulated in the bottom of the trap, one leg thereof essentially forms a pocket, the size and temperature at which it is maintained during operation of the system determining the rate at which condensate collects therein. Not only does the trap form a liquid seal, but another upstanding leg thereof forms an arm of a siphon for automatically removing liquid from the trap from time to time. After liquid is removed from the trap by siphon action, the condensate again collects therein for an interval of time until a seal is formed in the hot vapor by-pass passage, such interval of time determining the length of the defrosting period. Condensate then continues to collect in the trap until a sufficient quantity of liquid has been accumulated for the siphon to function to remove liquid from the trap and withdraw liquid from a region of the by-pass at a region intermediate the ends thereof. Hence, the accumulation of liquid condensate in a single trap determines not only the length of the defrosting periods but also the interval of time between defrosting periods.

In the embodiments of Figs. 1, 2, 3 and 6 the low temperature cooling unit section 10a will continue to function to produce a refrigerating effect in the frozen food space 11a while defrosting of the higher temperature cooling unit section 10b is being effected. Since hot expelled vapor is diverted into the by-pass passage in each of these embodiments at a region of the vapor line between the generator or vapor expulsion unit and the rectifier, a path of flow for hot expelled vapor is provided leading directly to cooling unit section 10b which offers less resistance to gas flow than that offered by the path of flow through the condenser. Accordingly, defrosting of the cooling unit section 10b by hot expelled vapor is promoted and at the same time liquid refrigerant will continue to be supplied to cooling unit section 10a for the latter to continue functioning to produce a refrigerating effect.

Likewise, in Fig. 5 hot expelled vapor formed in boiler pipe 26d will continue to be supplied to the condenser through the vapor line 27d while liberated pumping vapor is flowing through conduits 41d and 42d to the cooling unit during a defrosting period. However, in the embodiment of Fig. 4 all of the hot expelled vapor will flow through the by-pass passage directly to the cooling unit when a defrosting is being effected. This is so because the upper part of the liquid column in standpipe 52 of Fig. 4 will be effective to block flow of expelled vapor at the lower end of conduit 53 when liquid is removed from conduit 41c by siphon action, such liquid column in standpipe 52 offering considerably greater resistance to flow of vapor than the open by-pass connection 41c and 42c communicating with the vapor space of boiler pipe 26c at the opening 45c therein.

Modifications of the invention which has been illustrated and described will occur to those skilled in the art, and as it is desired that the invention not be limited to the particular arrangements set forth, it is intended in the claims to cover all those modifications which do not depart from the spirit and scope of the invention.

What is claimed is:

1. In refrigeration apparatus having a cooling element subject to formation of frost or ice thereon, structure for defrosting said cooling element including a trap having at least a pair of upstanding legs arranged to receive liquid, said structure being operable to effect defrosting of said cooling element when the legs of said trap are partially filled with liquid, and means embodied in said structure for rendering the latter inoperable to effect defrosting of said cooling element responsive to accumulation of a first definite quantity of liquid in said trap and for removing liquid from said trap responsive solely to accumulation of a second definite quantity of liquid therein to render said structure operable to initiate defrosting of said cooling element, said means embodied in said structure to initiate defrosting of said cooling element including provisions for removing liquid from said trap to deplete the latter of liquid to a quantity less than said first definite quantity.

2. A refrigeration system comprising a condenser, means including a vapor line for conducting vapor to said condenser, an evaporator connected to receive liquid from said condenser, said evaporator being subject to formation of frost or ice, structure for defrosting said evaporator including conduit means for conducting vapor from said vapor line to said evaporator, said conduit means including a first conduit connected to said vapor line and a second conduit which is joined to said first conduit and connected to said evaporator, a trap for collecting liquid which includes said first and second conduits, said trap having a part which extends downwardly below the juncture of said first and second conduits, and means responsive to change in liquid level for removing liquid from said trap and conducting such removed liquid from said conduit means at a region intermediate the ends thereof.

3. In the art of refrigeration with a system in which vaporous fluid flows to a place of condensation and condensate flows from the latter to a place of evaporation, the improvement which comprises the steps of flowing vaporous fluid to the place of evaporation in a path of flow which by-passes the place of condensation, condensing vaporous fluid and accumulating the condensate in a region in communication with said path of flow for a first interval of time while flowing vaporous fluid therethrough to the place of evaporation, forming a liquid seal and blocking flow of vaporous fluid in said path of flow responsive to accumulation of a first definite quantity of condensate when the first interval of time terminates, and removing liquid forming said seal by withdrawing liquid from said path of flow at a part intermediate the ends thereof and opening said path of flow for vaporous fluid responsive to accumulation of a second definite quantity of condensate at said region for a second interval of time whose length is determined by the time it takes to accumulate it at said region after the accumulation of the first definite quantity of liquid therein.

4. In the art of refrigeration with a system in which vaporous fluid flows to a place of condensation and condensate flows from the latter to a place of evaporation, the improvement which comprises flowing vaporous fluid to the place of evaporation in a path of flow which by-passes the place of condensation and includes a downwardly extending portion and an upwardly extending portion communicating with the place of evaporation, condensing vaporous fluid in the downwardly extending portion of the path of flow and accumulating the condensate in a region in communication with said path of flow for a first interval of time while flowing vaporous fluid therethrough to the place of evaporation, forming a liquid seal and blocking flow of vaporous fluid in said path of flow responsive to accumulation of a first definite quantity of condensate when the first interval of time terminates, and removing liquid forming said seal by withdrawing liquid from said path of flow at a part intermediate the ends thereof and opening said path of flow for vaporous fluid responsive to accumulation of a second definite quantity of condensate at said region for a second interval of time whose length is determined by the time it takes to accumulate it at said region after the accumulation of the first definite quantity of condensate therein, and transferring heat from another place in the system to the downwardly extending portion of said path of flow to reduce the rate at which condensation of vaporous fluid takes place at the inner wall surface thereof.

5. An absorption refrigeration system of the inert gas type comprising interconnected parts including a gas circuit having a cooling element in which liquid refrigerant evaporates in the presence of inert gas to produce a refrigerating effect, a vapor expulsion unit, a condenser, conduit means for conducting expelled vapor from said vapor expulsion unit to said condenser, conduit means for conducting liquid refrigerant from said condenser to said cooling element, a by-pass connection around said condenser for conducting expelled vapor from said vapor expulsion unit to said cooling element, said by-pass connection including a downwardly extending section and an upwardly extending section connected at its upper end to said cooling element, the downwardly extending section of said by-pass connection serving as a part in which vapor is condensed, means for accumulating the condensate at a region in communication with said by-pass connection for a first interval of time while expelled vapor flows therethrough to said cooling element, means in said by-pass connection utilizing said condensate to form a liquid seal to block flow of expelled vapor therethrough responsive to a first definite quantity of condensate accumulated by the time the first interval of time terminates, and means for removing said liquid seal by withdrawing liquid out of said by-pass connection at a part intermediate the ends thereof and opening said by-pass connection for flowing expelled vapor therethrough responsive to accumulation of a second definite quantity of condensate at said region for a second interval of time whose length is determined by the time it takes it to accumulate at said region after the accumulation of the first definite quantity of condensate therein.

6. An absorption refrigeration system as set forth in claim 5 in which the downwardly extending section of said by-pass connection is arranged to receive heat from said conduit means for conducting expelled vapor from said vapor expulsion unit to said condenser.

7. An absorption refrigeration system as set forth in claim 6 in which said conduit means for expelled vapor is in thermal exchange relation with the downwardly extending section of said by-pass connection.

8. An absorption refrigeration system as set forth in claim 5 in which said vapor expulsion unit includes a boiler pipe, the downwardly extending section of said by-pass connection being in thermal exchange relation with said boiler pipe.

9. Absorption refrigeration apparatus of the inert gas type comprising interconnected parts including a gas circuit having low and higher temperature cooling elements for circulation of inert gas successively therethrough and in which liquid refrigerant evaporates in the presence of the gas, said low and higher temperature cooling elements being arranged to cool frozen and unfrozen food spaces, respectively, a vapor expulsion unit, a condenser, conduit means for conducting expelled vapor from said vapor expulsion unit to said condenser, conduit means for conducting liquid refrigerant from said condenser to said low temperature cooling element for flow therethrough and from the latter to said higher temperature cooling element for flow therethrough, a by-pass connection around said condenser for conducting expelled vapor from said vapor expulsion unit to said higher temperature cooling element for flow therethrough, means for accumulating liquid in the system at a region in communication with said by-pass connection for a first interval of time while expelled vapor flows therethrough to said higher temperature cooling element, means in said by-pass connection utilizing said accumulated liquid to form a seal to block flow of expelled vapor therethrough responsive to a first definite quantity of the liquid accumulated by the time the first interval of time terminates, and means for removing said liquid seal by withdrawing liquid out of said by-pass connection at a part intermediate the ends thereof and opening said by-pass connection for flowing expelled vapor therethrough responsive to accumulation of a second definite quantity of condensate at said region for a second interval of time whose length is determined by the time it takes to accumulate it at said region after the accumulation of the first definite quantity of condensate therein.

10. Absorption refrigeration apparatus as set forth in claim 9 in which expelled vapor is condensed in said by-pass connection due to "cold wall" effect, such condensate constituting the liquid which is accumulated by said liquid accumulating means.

11. A refrigeration system comprising a plurality of parts including a condenser, structure including a vapor line for supplying vapor at an elevated temperature to said condenser, an evaporator connected to receive liquid refrigerant from said condenser, said evaporator being subject to formation of frost or ice, conduit means for conducting vapor at an elevated temperature to said evaporator to defrost the latter, said conduit means including a vertically extending conduit section which is arranged to receive heat from a part of said vapor supply structure and connected to receive vapor therefrom, said conduit means having a trap to provide a liquid seal to stop flow of vapor therethrough by accumulating therein condensate formed in said vertically extending conduit section at a rate responsive to a temperature differential between the latter and said part of said vapor supply structure which is in a definite temperature range during normal operation of the refrigeration system, means for removing liquid from said conduit means to flow vapor therethrough, means for starting and stopping the refrigeration system, and means whereby condensation of vapor is effected in said vertically extending conduit section when operation of the refrigeration system is resumed following a shut-down period only when the temperature differential between said conduit section and said part of said vapor supply structure aproaches the definite temperature range maintained during normal operation of the refrigeration system.

12. An absorption refrigeration system of the inert gas type comprising interconnected parts including a circuit for inert gas having a cooling element in which liquid refrigerant evaporates in the presence of the inert gas to produce a refrigerating effect, a condenser, structure comprising a vapor expulsion unit for supplying vapor to said condenser, means for heating said vapor expulsion unit, means for controlling said heating means to start and stop the refrigeration system, means for conducting liquid refrigerant from said condenser to said cooling element, an inert gas connection for flowing inert gas into and from said condenser, a by-pass connection around said condenser for conducting expelled vapor from said vapor expulsion unit to said cooling element, said by-pass connection including a vertically extending conduit section which is arranged to receive heat from a part of said vapor supply structure and connected to receive vapor therefrom, said by-pass connection being formed to provide a liquid seal to stop flow of vapor therethrough by accumulating therein condensate formed in said vertically extending conduit section at a rate responsive to a temperature differential between said vertically extending conduit section and the part of said vapor supply structure in a definite temperature range during normal operation of the refrigeration system, means for removing liquid condensate from said by-pass connection to flow vapor therethrough, and means utilizing inert gas flowing into and from said condenser through said inert gas connection whereby condensation of vapor is effected in said vertically extending conduit section when operation of the refrigeration system is resumed following a shut-down period only when the temperature differential between said conduit section and the part of said structure approaches the definite temperature range maintained during normal operation of the refrigeration system.

13. In an absorption refrigeration system of the inert gas type, the improvement which comprises expelling vapor from absorption liquid in a place of heating, flowing the expelled vapor in a path of flow to a place of condensation for condensing refrigerant vapor therein and conducting refrigerant condensate from the last-mentioned place to a place of evaporation in which refrigerant evaporates in the presence of an inert gas, flowing inert gas in the system to and from the place of condensation, flowing expelled vapor from the path of flow through a by-pass around the place of condensation to the place of evaporation, heating a region of said by-pass by heat derived from a zone in said path of flow, forming a liquid seal in said by-pass to stop flow of vapor therethrough by accumulating condensate formed in said heated region thereof at a rate dependent upon the temperature differential between said region and said zone in said path of flow which is in a definite temperature range during normal operation of the system, removing liquid from said by-pass for flowing vapor to said place of evaporation, flowing inert gas in the system into said place of condensation and said path of flow and said by-pass upon stopping the system, and, when operation of the system is resumed, displacing inert gas in said region of said by-pass by expelled vapor only when the temperature differential between said region and the zone in said path of flow for expelled vapor approaches the definite temperature range maintained during normal operation of the refrigeration system.

14. In an absorption refrigeration system of the inert gas type, the improvement which comprises expelling vapor from a body of absorption liquid in a place of heating, flowing the expelled vapor through absorption liquid to analyze the vapor and thence to a place of condensation for condensing refrigerant vapor therein, conducting refrigerant condensate from the place of condensation to a place of evaporation in which refrigerant evaporates in the presence of an inert gas, flowing expelled vapor from the place of heating to the place of evaporation through a by-pass around the analyzer and the place of condensation, heating a region of said by-pass at a level lower than the liquid surface level of the body of absorption liquid in said place of heating by heat derived from said body of absorption liquid, forming a liquid seal in said by-pass to stop flow of vapor therethrough by accumulating condensate formed in said heated region thereof at a rate which is dependent upon the temperature differential between said region and the body of absorption liquid in said place of heating, and removing liquid from said by-pass for flowing vapor to said place of evaporation.

15. The improvement set forth in claim 14 in which said region of said by-pass is in thermal exchange relation with the body of absorption liquid in said place of heating.

16. In refrigeration apparatus having a cooling unit subject to formation of frost or ice, structure for defrosting said cooling unit including a trap having at least a pair of upstanding legs arranged to receive liquid, and means embodied in said structure for rendering the latter operable to effect defrosting of said cooling unit for a first interval of time during which a first definite quantity of liquid is being accumulated in the aforesaid legs of said trap and for subsequently rendering said structure inoperable to effect defrosting of said cooling unit for a second interval of time whose length is determined by the time it takes for a second definite quantity of liquid to accumulate in the legs of said trap after the accumulation of the first quantity of liquid therein, said means embodied in said structure for rendering the latter inoperable to effect defrosting of said cooling unit including provisions for removing liquid from said trap responsive to the accumulation of the second definite quantity of liquid therein.

17. In refrigeration apparatus having a cooling unit subject to formation of frost or ice, structure for defrosting said cooling unit including conduit means for conducting thereto vapor at an elevated temperature, said conduit means having associated therewith a trap provided with at least a pair of upstanding legs arranged to receive liquid, and means embodied in said structure for rendering said conduit means operable to conduct vapor to said cooling unit for a first interval of time during which a first definite quantity of liquid is being accumulated in the aforesaid legs of said trap and for subsequently rendering said conduit means inoperable to conduct vapor to said cooling unit for a second interval of time whose length is determined by the time it takes for a second definite quantity of liquid to accumulate in the legs of said trap after the accumulation of the first definite quantity of liquid therein, said means embodied in said structure for rendering said conduit means operable and inoperable to conduct vapor to said cooling unit including provisions for removing liquid from said trap responsive to the accumulation of the second definite qunatity of liquid therein to render said conduit means operable to conduct vapor to said cooling unit to initiate defrosting thereof for another first interval of time.

18. In hermetically sealed refrigeration apparatus having a cooling unit subject to formation of frost or ice, structure for defrosting said cooling unit including a trap having at least a pair of upstanding legs arranged to receive liquid, and means embodied in said structure for rendering said structure operable to effect defrosting of said cooling unit for a first interval of time during which a first definite quantity of liquid is being accumulated in the aforesaid legs of said trap and for subsequently rendering said structure inoperable to effect defrosting of said cooling unit for a second interval of time whose length is determined by the time it takes for a second definite quantity of liquid to accumulate in the legs of said trap after the accumulation of the first quantity of liquid therein, said means embodied in said structure for rendering the latter operable to effect defrosting of said cooling unit forming a component of said hermetically sealed apparatus.

19. In hermetically sealed refrigeration apparatus having a cooling unit subject to formation of frost or ice, structure for defrosting said cooling unit including conduit means for conducting thereto vapor at an elevated temperature, said conduit means having associated therewith a trap provided with at least a pair of upstanding legs arranged to receive liquid, and means embodied in said structure for rendering said conduit means operable to conduct vapor to said cooling unit for a first interval of time during which a first definite quantity of liquid is being accumulated in the aforesaid legs of said trap and for subsequently rendering said conduit means inoperable to conduct vapor to said cooling unit for a second interval of time whose length is determined by the time it takes for a second definite quantity of liquid to accumulate in the legs of said trap after the accumulation of the first definite quantity of liquid therein, said means embodied in said structure for rendering said conduit means operable and inoperable to conduct vapor to said cooling unit forming a component of said hermetically sealed apparatus.

20. A hermetically sealed refrigeration system comprising a condenser, means including a vapor line for conducting vapor to said condenser, an evaporator connected to receive liquid from said condenser, said evaporator being subject to formation of frost or ice, structure for defrosting said evaporator including conduit means for conducting vapor from said vapor line to said evaporator, said conduit means including a first conduit connected to said vapor line and a second conduit which is joined to said first conduit and connected to said evaporator, a trap for collecting liquid which includes said first and second conduits, said trap having a part which extends downwardly below the juncture of said first and second conduits, and stationary means forming a component of said hermetically sealed system for intermittently removing liquid from said trap responsive to an operating condition in said hermetically sealed system and conducting the removed liquid from said conduit means at a region intermediate the ends thereof.

References Cited in the file of this patent
UNITED STATES PATENTS

| | | |
|---|---|---|
| 2,252,791 | Ullstrand | Aug. 19, 1941 |
| 2,266,584 | Bergholm | Dec. 16, 1941 |
| 2,269,102 | Lynger | Jan. 6, 1942 |
| 2,285,884 | Ashby | June 9, 1942 |
| 2,297,287 | Brace | Sept. 29, 1942 |
| 2,303,816 | Brace | Dec. 1, 1942 |
| 2,468,104 | Phillips | Apr. 26, 1949 |
| 2,749,095 | Anderson | June 5, 1956 |